Patented June 24, 1941

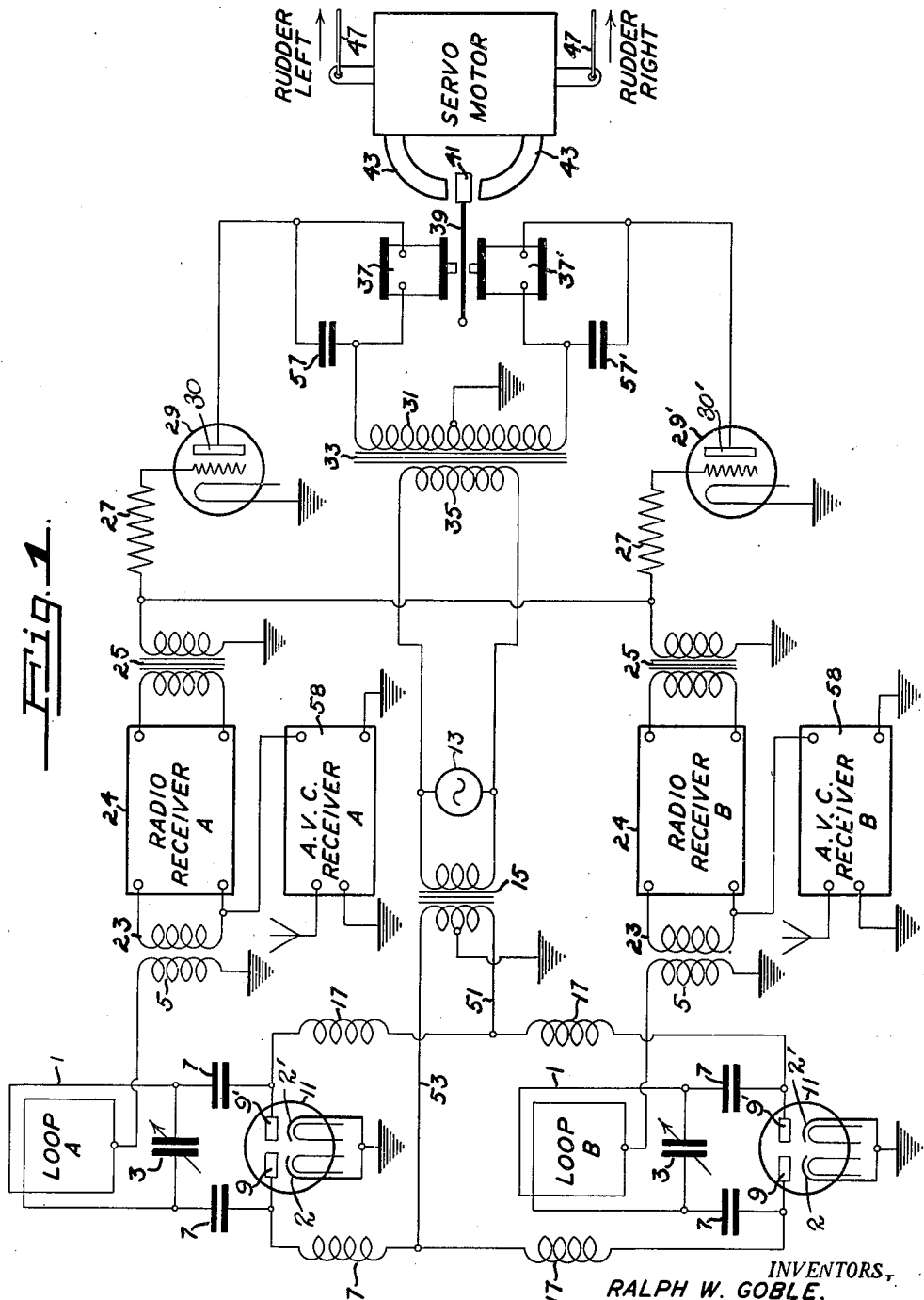

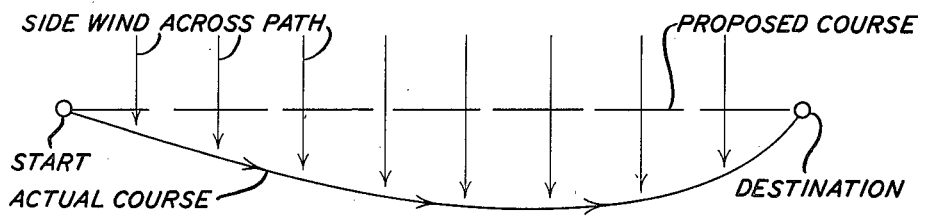
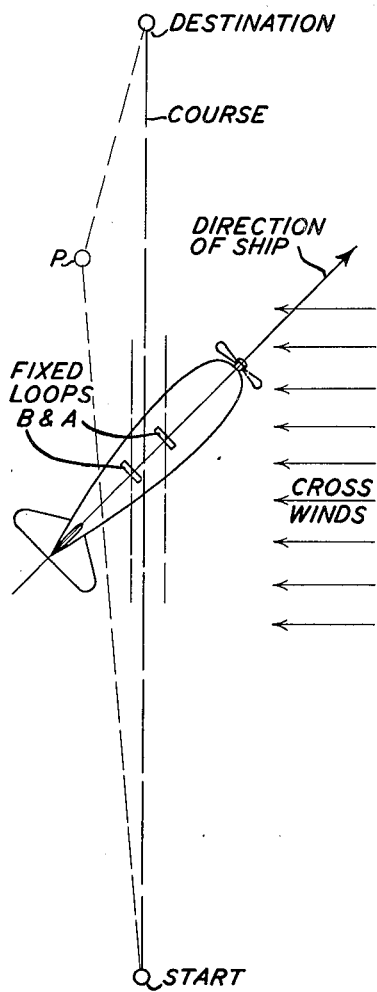
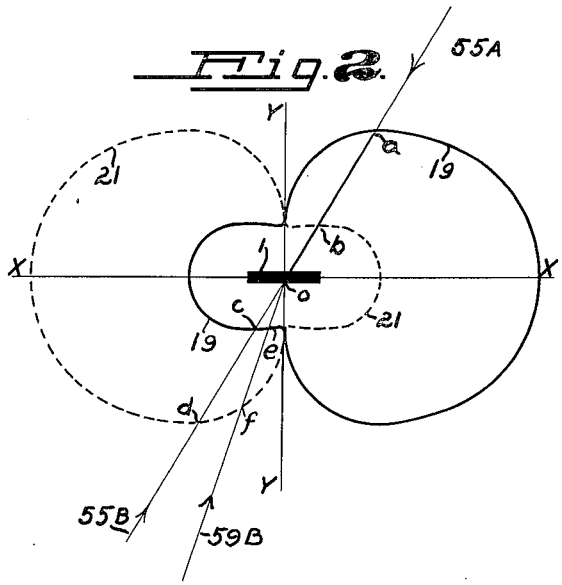

2,247,294

UNITED STATES PATENT OFFICE 2,247,294

RADIO DIRECTIONAL CONTROL FOR AIRCRAFT

Ralph W. Goble and Oliver V. Phillips, Long Beach, Calif., assignors to Leo M. Harvey, La Canada, Calif.

Application January 20, 1940, Serial No. 314,854

6 Claims. (Cl. 250—2)

This invention relates to radio equipment for keeping a vessel upon a predetermined course. It is primarily designed for the control of aircraft, but it will be obvious to those skilled in the art that it is applicable to the control of any vessel which may be deflected from such a source by cross-currents, whether the vessel be an airplane, airship or surface vessel. Furthermore, although the device as described and claimed is complete and operative in itself, it finds its best application as a part of a complete radio control system, and particularly when used in combination with the "Proportional control system" described and claimed in the copending application, Serial No. 394,891, filed January 20, 1940, by Ralph S. Thacker.

Radio direction finders of the "homing coil" type have been well known for many years. More recently, these devices have been improved to give a visual indication as to whether the vessel upon which the device is mounted is headed directly upon its course or to the right or left thereof. Direction finders of this latter type (right-and-left indicators) use the received waves to develop electric currents which are effectively in one direction when the axis of the device is directed to the right of the wave source and in the other direction when the axis is directed to the left of the source, being zero when the axis of the direction finder is pointed directly toward the source of the waves. Such direction finders may be used merely to give an indication of right or left upon a center-zero meter, or a relay may be substituted for the meter and, upon operation to one side or the other of zero, may be used to actuate the controls of the vessel which actuate the rudder thereof.

When this is done in the simple "homing coil" manner, the direction finder is mounted with its axis in a fixed position coincident with the axis of the ship, which maintains an apparent course directly toward its destination or "home" station. The actual course may, however, be quite different. If, for example, a plane be flown in accordance with the indications of such a directional control, and a cross-wind be blowing, the plane will eventually arrive at its destination, but it will do so by a circuitous route which may carry it over dangerous or unknown territory.

It is the purpose of this invention to avoid these difficulties, and to provide a radio directional control which will maintain a vessel substantially upon a direct course irrespective of cross-currents tending to deviate it therefrom; to provide a radio directional control which, when a vessel is off of the direct line between two radio transmitters, will operate the controls in such manner as to direct the plane back to such direct line; to provide a directional control system which will so operate the directive mechanism of a vessel as to come to an equilibrium with the vessel upon its true course, i. e., to cause a plane to "crab into the wind" to the necessary degree; to provide a directional control which will operate upon an unmodulated wave, a broadcast wave, or a radio beacon, as may be desired; to provide a directional radio control which is adapted to operate in combination with the "proportional control system" described in the copending application previously referred to; and to provide a radio directional control which is sufficiently simple, light, and rugged to render its operation upon either commercial, military, or private aircraft economical and practical.

Our invention possesses numerous other objects and features of advantage, some of which, together with the foregoing, will be set forth in the following description of specific apparatus embodying and utilizing our novel method. It is therefore to be understood that our method is applicable to other apparatus, and that we do not limit ourselves, in any way, to the apparatus of the present application, as we may adopt various other apparatus embodiments, utilizing the method, within the scope of the appended claims.

Referring to the drawings:

Fig. 1 is a schematic diagram of the device of our invention in simplified form.

Fig. 2 is a diagram showing, in polar coordinates, the directional pattern of a radio direction finder as used in our invention.

Fig. 3 is a diagram indicating the deviation of the actual course of a plane, operated in accordance with the homing coil controls of the prior art, from the proposed course or direct line between the start and destination.

Fig. 4 is a diagram (not to scale) indicating the attitude of a plane operated in accordance with our invention, along its true course when subjected to cross-currents or winds.

Considered broadly, the method of our invention involves the use of two radio direction finder systems of the type already referred to, one of these systems being tuned to receive a wave from the start of the course, while the other is tuned to a wave of different frequency from the destination. (It will be apparent that the "start" may be a considerable distance to the rear of the actual start while the "destination" may be some distance beyond the actual one; in other words, the actual course may be only a segment of a much longer theoretical course.)

The two signals are amplified, preferably in inverse proportion to their intensity, and the resultant direction indicating currents are combined so that their effects add algebraically, the reading of the right and left indicating meter or the operation of the right and left control relay being dependent upon the algebraic sum of the two direction indicating currents. The result of this is that the controls will be brought to neutral whenever the vessel is upon the direct line between the two ends of its desired course, whatever the attitude of the plane or other vessel may be with respect to this line. If its actual line of flight be in any degree transverse to the course, either because of cross-currents or because of an improper setting of the controls, the departure from the desired line of flight will cause the two radio waves to be received in greater degree from one side of the axis of the plane than from the other, so that the two directional currents no longer balance out. This causes an off-course indication to be set up, and the controls of the vessel are operated in such sense as to head the vessel back toward and, in general, across the true course, so that eventually the reception from the other side of the axis of the plane will preponderate, reversing the controls to a sufficient degree to bring the plane back across the course in the opposite direction. The actual flight of the plane is therefore by a succession of yaws, first to one side of the course and then to the other, but by proper adjustment of the sensitivity of the control relays these yaws may be made of relatively small magnitude so that the plane follows substantially its true predetermined course.

Considering in detail the form of the apparatus which we have chosen for purposes of illustration, the two radio direction finders are indicated as being identical in construction, and are indicated as "A" and "B" respectively. The detailed description may be taken as applying to either, and the same reference characters are applied to the duplicated parts. It should be kept in mind, however, that until otherwise indicated, the action of the devices is being considered individually and not in combination.

All such direction finders which have received any material degree of application comprise an arrangement for superimposing the reception characteristics of a loop either upon those of a fixed antenna or those of another loop differently oriented. In actual practice the forms combining loop and vertical antenna have proved preferable to those employing two loops, and, furthermore, we have found the most satisfactory method of obtaining the vertical component to be a modification of the one described by Hinman in the United States Bureau of Standards Journal of Research, vol. 11, page 733, although the use of this particular form is not essential.

As applied here, the antenna system of each direction finder comprises a loop 1 which is mounted in fixed orientation with respect to the vessel, the axis of the loop being parallel to the axis of the vessel to be controlled, i. e., the plane of the loop being perpendicular to the axis of the vessel. It is well known that such a loop, if properly shielded and accurately balanced with respect to ground, has a figure-eight directional characteristic; i. e., with a received wave of given intensity the potential developed across the terminals of the loop is proportional to the sine of the angle between the direction of reception and the axis of the loop. In this connection the reversal of sign when the sine function passes through zero means, physically, a reversal of phase of the received wave as its direction of reception passes from one side to the other of the loop axis.

If the loop is not balanced exactly with respect to the capacity of its terminals to ground, the figure-eight pattern is distorted, owing to the addition of an antenna effect of non-directional type. If the antenna effect develops a potential which is exactly equal to the maximum potential developed by the loop effect, and is exactly in phase with the loop potential in, say, the 90° position of the loop (and accordingly exactly out of phase with the loop potential when the reception is from the 270° position) the reception pattern is converted to a cardioid with its axis in the plane of the loop and hence at right angles to the axes of the vessel and loop.

If the antenna effect is not exactly equal to the loop effect the result will be, in general, a two lobed curve which will have clearly defined nulls only if the antenna effect is exactly in phase with the loop effect and is lower in magnitude than the maximum loop effect. In practice these two conditions are difficult to maintain, and since, although they may be considered desirable, they are not necessary, we prefer to utilize a loop which is substantially balanced when considered by itself, and to add to the effect thus produced an antenna effect by effectively grounding one end of the loop.

As shown in Fig. 1, the loop 1 is provided with a tuning condenser 3 bridged across its terminals, and is center-tapped for a connection with the primary coil 5 of a radio frequency transformer, the other end of the primary being grounded. Each of the two terminals of the loop 1 is connected through a blocking condenser 7 with one of the anodes 9 or 9' of a double diode rectifier tube 11, the cathodes 2, 2' of which are also grounded. When a positive potential is applied to either of the anodes 9, 9', the path between that anode and its associated cathode becomes conductive, effectively grounding one end of the loop.

A source 13 of alternating current applies such a positive potential to the two anodes alternately, through a transformer 15 whose secondary is center-tapped and grounded and whose terminals connect through radio frequency chokes 17 to the two anodes 9, 9'. It will therefore be seen that when one of the anodes 9 becomes positive one end of the loop will be grounded, adding the antenna effect to the loop effect in one direction, and that an instant later the originally positive anode 9 will have become negative, effectively isolating its end of the loop while the other end of the loop will be grounded through the anode 9' and the antenna effect will be added to the loop effect in the opposite direction. In practice we prefer to use a source 13 which operates at a frequency of from one hundred and fifty to two hundred cycles per second, resulting in from three hundred to four hundred reversals within this period. The source 13 may be a vacuum tube oscillator, motor generator, or dynamotor, depending upon convenience, but it is important that its waveshape should be symmetrical about its zero axis.

As a result of this arrangement the directional characteristics of the device alternate between those indicated by the polar diagram of Fig. 2.

When the anode 9 becomes positive the directional characteristic is that indicated by the solid curve 19 of this figure, the position of the loop being indicated by the heavy line 1 and its plane coinciding with the axis of symmetry 0 of both curves. When the other anode 9' becomes positive the pattern reverses, as shown by the dotted curve 21.

To each of the radio frequency primary coils 5 there is coupled a secondary coil 23 which feeds a radio receiver 24. This receiver may be of any satisfactory type, i. e., one which is stable in operation and has sufficient sensitivity. We prefer to use a receiver having at least one stage of radio frequency amplification and several stages of intermediate frequency amplification. The audio frequency output is fed into a transformer 25.

The audio-frequency signal applied to the transformer 25 varies in intensity in accordance with the direction of the received signal in accordance with the polar diagrams of Fig. 2. Considered in this connection and at this point these polar diagrams have no significance as to phase, but are indicative of intensity only, during the respective half cycles of the source 13. In other words, when a radio wave of given intensity is being received during the half cycle when the source 13 is so poled as to give the directional characteristics of curve 19, the average current flowing in the transformer primary will be proportional to the radius vector of curve 19 in the direction from which the wave is being received. If the wave be unmodulated at its point of transmission the average current will be the total current as determined by signal intensity plus any fixed bias applied to the tube feeding the transformer. If a modulated wave is being received the modulations will be superimposed on the average current. But as long as we are considering only the one half cycle when the anode 9 is positive the only characteristic of the current which changes with azimuth of reception is intensity.

The same comments hold true with respect to conditions an instant later, when the source 13 reverses and the average current in the transformer primary is indicated by the curve 21. If the received wave is unmodulated the difference between the currents represented by the two curves 19, 21 defines an alternating component of the frequency of the source 13, which is passed by the transformer 25, so that the device will operate on unmodulated as well as modulated waves. The source frequency component becomes zero for waves arriving from either direction along the axis y, y of the coil, where the curves 19 and 21 intersect. Any other modulation component will have a finite value at this azimuth, but this cancels out later, as will be described, the important point being that the device is operative on either modulated or continuous waves.

It is at this point of the apparatus that the two directional receivers feed into a common output circuit, which is, however, identical with the circuit which would be used with either alone, and in fact may be so used if desired. The secondaries of the two transformers 25 have one end of each connected to ground and the other ends connected in parallel and thence, through two individual resistors 27, to the grids of the balanced output tubes 29, 29'. These tubes may either be high vacuum amplifier tubes as shown, or they may be tubes of the "grid-glow" type, which trigger at a definite and predetermined control voltage. In either case plate current is supplied to the two tubes alternately from the secondary 31 of a transformer 33 whose primary 35 is excited by the source 13. The secondary 31 is grounded at its center point and its two terminals are connected respectively to the plates 30, 30' of the tubes 29, 29' through the coils 37, 37' of a differential relay.

In the present case this relay is shown as having two separate opposed coils operating upon a common armature 39, but this is merely for convenience in the showing and it is clear that a differentially wound d'Arsonval relay or any other type of relay or connection therefor, of which there are many known in the art, wherein currents from the two output tubes would have opposite effects, would be a satisfactory equivalent. As shown, the relay armature carries upon its outer end a valve cap 41 which, when the relay is operated in one direction or the other, serves to close one or the other of the air tubes 43, thus actuating a servo motor 45 to operate the rudder of the vessel through control lines 47. The servo motor which we have used is that described in the application for United States Patent, filed by Jess S. Morrison, and which was notarized before D. A. Peterson, a notary public in and for the county of Los Angeles, State of California, July 24, 1939.

Considering now the operation of either of the direction finders "A" or "B" considered alone in connection with the action of the two tubes 29, 29', this operation occurs in alternate successive half cycles determined by the operation of the source 13. During the first half cycle the lead 51, say, (from the transformer 15) is negative and the lead 53 is positive, effectively grounding the left hand lead of the loop and resulting in an output current to the transformer 25 whose magnitude is determined by the direction of arrival of the radio signal with respect to the polar curve 19. Thus if the direction of arrival of the wave were from the azimuth indicated by the line 55A of Fig. 2, the magnitude of the signal and of the resultant current and potential developed in the transformer 25 would be proportional to the heavy portion o—a of this line, included between the polar origin at the center of the figure and the solid curve 19. During the time that this condition obtains the plate of tube 29 is positive with respect to its grounded cathode while the plate of tube 29' is negative. Current, therefore, will flow only through tube 29 and relay coil 37, tending to pull the relay armature 39 upward as shown in the figure.

During the next half cycle, occurring an instant later, lead 53 becomes negative and lead 51 positive, grounding the right hand side of the loop. At the same instant the polarity on the plates of 29, 29' is also reversed, and hence a current flows through relay coil 37', attracting the armature downward with a force proportional to the intercept o—b on line 55A between the origin and the dotted curve 21. The relay armature is constructed with sufficient mass so that it cannot vibrate in the period of the reversals of pull between the coils 37 and 37'. Furthermore, by-pass condensers 57, 57' are preferably bridged around the respective relay coils in order to smooth out the pulsations in the relay current, and the net pull upon the relay armature is equal to the arithmetic difference or the algebraic sum of the currents through the two tubes 29, 29', these currents being considered as opposite in sign, since they are opposite in effect on the armature.

An inspection of Fig. 2 will show that the net effect or pull upon the armature 39 is zero when and only when the received wave is arriving from the direction of the axis $y$, $y$ of the coil, and that it increases in one direction or the other with extreme rapidity for any deviation from the axis. For this reason either one of the two directional receivers, if used alone and tuned to a radio wave arriving from the destination end of the course, will act as a homing coil receiver and controller in accordance with known practice.

In accordance with our invention, however, both of the receivers are used simultaneously. If the device be operated at a position where the waves received from front and rear of the course are of approximately equal strength, the device will operate satisfactorily with only the equipment already described, and it is operative to carry out its designed function with a fair degree of satisfaction when used in this manner, even though the waves may have a very considerable degree of difference in amplitude. More satisfactory results are, however, obtained by amplifying the received waves in inverse proportion to their intensity at the point of reception, so that the intensity of the indications depends solely on their azimuth of reception. This result can be achieved by an application of the well known automatic volume control or "AVC." In the present showing this AVC is supplied by a separate non-directional receiver 53, one of which is provided for each of the directional receivers and is tuned to the same wave as the associated receiver. This arrangement is so shown because this method of applying automatic volume control is obvious to those skilled in the art and it is believed that a method of utilizing the directional receiver to apply the automatic volume control would, if shown in full, unnecessarily complicate the disclosure of the present invention, of which it is not believed to be a part, being more properly the subject of a separate patent application.

With the two signals amplified to the same output volume, Fig. 2 may be considered to represent the magnitudes of the potentials developed in either or both of the secondaries of the transformers 25. If the vessel is directly upon the line between the stations transmitting the two signals, however, and the potential developed by direction finder "A" is proportional to the intercept between the origin and the curve 19 along some line such as 55A, the potential developed by the direction finder "B" will be proportional to the intercept $o$—$c$ of the same curve 19 along the line 55B, which is the extension in reverse of the line 55A, and the mean of these potentials will be applied to the grid of the tube 29, so that the relative magnitude of a signal applied to the grid of this tube will be proportional to the distance $a$—$c$ between the two intersections of the curve 19 with the line 55A, 55B. Otherwise stated, the voltage applied to the grid of tube 29 is proportional to the sum of the voltages of the two transformers 25. When the source 13 reverses in polarity a similar effect will be produced upon the grid of the tube 29′ by the two signals, setting up an opposing force upon the armature 39 which is proportional to the distance $d$—$b$ between the two intersections of the curve 21 with the line 55A, 55B. It will be seen that as long as the vessel is on the direct line between the two radio transmitters these effects will be equal and opposite and no controlling impulse will be applied through the relay to the servo motor to alter the path of the plane, whatever that path may be with respect to the desired true course. In other words, the connection of the two radio direction finders to the common pair of output tubes has again resulted effectively in an algebraic addition of the two signals, which, since these signals are equal and opposite, gives a zero result.

If, however, the plane be off of the direct line between the two transmitters, e. g., at point P in Fig. 4, the signals will not be received from along opposite extensions of the same straight line, but will arrive at different angles to the axis $y$, $y$, as, for example, from along some line 55A from ahead and from along a line 59B from the rear. This results in a voltage proportional to the length $aoe$ applied to tube 29, and one proportional to $bof$ applied to 29′. The signals no longer being equal and opposite the algebraic sum is no longer zero, and the relay will operate the controls in such sense as to head the plane back toward its course. The degree of deviation from the course necessary to accomplish this result is dependent upon the sensitivity of the receivers and the relays. It is preferable to have a definite margin or threshold difference in signal strength in order to operate the relays, but, particularly where the device is used as described, without the use of the proportional control described in the previously mentioned copending application, it is desirable that this margin or threshold value be small. When the device is properly set the plane will proceed along the average course predetermined for it by a succession of small yaws to one side or the other thereof, but its apparent course will, on the average, be as shown in Fig. 4 with the plane headed into the wind to the right degree to compensate for the wind velocity.

In practice, a vessel equipped with the device is started toward its destination along the course as defined by radio and a magnetic compass. Starting with its controls in neutral it will fly along this course until carried off of it, either by currents or by some small error in setting the course, to a sufficient degree to unbalance the directional current to the minimum or threshold value of operation, when the servo motor operates to guide it back into line.

In general, servo motors are of two types, the first of which applies a certain definite amount of right or left rudder as long as the operating impulse is applied, and then returns to neutral, and the second of which, whereof the motor described in the Morrison application above referred to is the unique example, applies an amount of rudder which increases by fixed small increments (up to a predetermined maximum) as long as the operating impulse lasts, whereafter it returns the rudder to neutral. With the vessel off course only to such a degree as will cause minimum operative unbalance of the directional currents, application of the rudder for a very short period will return the vessel to its course.

If the vessel starts or is carried off of its course to any very considerable degree, so that the rudder actuating impulse is applied for a considerable period of time before the plane returns to the direct line between the two radio transmitters, the vessel will eventually assume an attitude along a line bisecting the angle between the vessel and the two transmitters. In this position a stable balance between the two directional currents occurs, and the plane will continue along this course until it reaches the direct line between the start and the destination. As soon as it has reached and crossed this line the equilibrium of the device becomes unstable, so that any deviation from the transverse line of flight will so apply the rudder as to increase the deviation. If such accidental deviation is toward the destination, the plane will circle through parallelism to the true course and thence back across it at an angle of less than 90°, repeating this action in a series of oscillations which will, in practice, become of decreasing amplitude until the plane is substantially on the true course. If the initial accidental deflection be back toward the start of the true course the plane will make a turn of approximately 270° and head back toward its destination again since the device is also in unstable equilibrium when flying a reverse course. Experience has shown that the conditions of unstable equilibrium are, in practice, upset almost instantly, and that when the plane once reaches a position on its true course it promptly assumes this course and adheres closely thereto from that point on.

It will be understood that in practice the transverse course is only assumed in cases where the initial deviation from the desired course is relatively large, as, for example, where a plane takes off from a field considerably to one side of the line between the two transmitting stations marking the course. Once the true course has been reached, the deflections to either side thereof become extremely small; on trial flights it has been found that the maximum deviation from a true course will seldom be in excess of two or three hundred feet.

The condition of unstable equilibrium also exists in the case of a plane which has passed over the transmitter at the destination end of the course, or in the case of a plane which is on the line of the course but has not yet reached the station at the "start." If, however, it should be desirable for any reason to use this invention for flying any of the courses which have been described as "unstable," this may be done by reversing the connections of the transformer 15 to one of the directional receivers. Thus, if it were desired to fly with both of the guiding transmitters ahead, the phase of the potential fed to receiver B would be reversed, while if it were desired to fly with both guiding stations to the rear of the plane the phase of the potential fed to receiver A would be reversed. Either of these reversals would make a transverse course away from the direct line between the two control stations a stable course, or reversing the relay connections would have the same effect. These modifications are given for illustrative purposes only, since it is clear that there are numerous combinations of connections which will give workable operation in manners useful under special conditions.

The case may also arise where both transmitters are either behind or ahead of the vessel. Here the sensitivity to deviations from the course is dependent upon the ratios of the distances between the stations and those between the stations and the vessel. In this case, however, the true course is a stable one, and no stable transverse course exists.

It is obvious that many other modifications may be made in the apparatus as here described without departing from the essentials of this invention. For example, the type of output relay shown is illustrative only and in actual operation it is usually advantageous to interpose a relay of more sensitive type between the tubes and the valve-actuating relay. This is less important when grid-glow tubes are used as the output tubes 29, 29'. It is also possible to use a single double diode for grounding the ends of both loops if proper precautions be taken to make the leads short and to avoid interaction between the receivers. Other modifications will suggest themselves to those skilled in the art and we therefore do not wish to be limited to the exact embodiment shown except as such limitations are expressed in the claims.

We claim:

1. Radio control apparatus for a dirigible vessel comprising a pair of directional antenna systems for mounting on said vessel with their receptional axes of symmetry parallel with the longitudinal axis of said vessel, a radio receiver associated with each of said antenna systems, means for adding algebraically the output currents of said radio receivers, means for effectively reversing the sense of the output current delivered from each of said receivers in accordance with the reception of radio waves from one or the other side of said axis of symmetry, whereby a signal received from the right of said vessel on either of said antenna systems will produce an output current effectively of one sign while a signal received from the left of said vessel will produce a current effectively of opposite sign, a separate receiver and a non-directional antenna associated with each of said previously mentioned receivers and connected to maintain the amplification thereof substantially in inverse ratio to the intensity of signal received thereby, and means responsive to the sign of the sum of the output currents from said first mentioned receivers for operating the steering mechanism of said vessel.

2. Radio control apparatus for dirigible vessels comprising a pair of right-and-left indicating radio direction finders connected to a common output circuit and including a pair of antennae adapted for mounting on said vessel with their axes of zero indication parallel to the directional axis of said vessel, automatic volume control means on each of said direction finders for maintaining the directional sensitivity thereof at substantially the same level, relay means responsive to the algebraic sum of the output currents of said direction finders, and means operative in response to said relay means for steering said vessel.

3. The method of maintaining a dirigible vessel on a course determined by a pair of substantially non-directional radio transmitters operating at different frequencies at opposite ends of said course, said vessel being porvided with a plurality of similarly oriented directional antenna systems and radio receivers associated therewith which comprises the steps of tuning a respective one of said receivers to receive the frequency of each of said transmitters, adjusting the sensitivity of said receivers to be substantially in inverse ratio to the strength of signal received at said vessel from said transmitters, synchronously and periodically varying the directional characteristic of each of said antenna systems and reversing the direction of current flow from each of said receivers to provide an average output current from each thereof whose sense is dependent upon the side of said craft from which the respective signal is received, mixing said output currents, and steering said vessel in accordance with the sense of the mixed average current in such a direction as to decrease the total absolute value of the same.

4. The method of maintaining a dirigible vessel substantially upon a true course determined by a pair of substantially non-directional radio transmitters operating at different frequencies at opposite ends thereof, said vessel being provided with a pair of right-and-left indicating radio direction finders each oriented to deliver an output current whose effective sense is determined by the direction with respect to the axis of said vessel from which a radio signal is received thereby, which includes the steps of tuning said direction finders respectively to receive signals from each of said transmitters, adjusting the sensitivity of said direction finders substantially in inverse ratio to the strength of said signals as received at said vessels, mixing the output current of said direction finders, setting said vessel originally substantially along said course, and steering said vessel in accordance with the sense of said mixed output currents in a direction such as to reduce the total absolute value thereof.

5. The method of maintaining a dirigible vessel substantially upon a true course determined by a pair of substantially non-directional radio transmitters operating at different frequencies at opposite ends thereof, said vessel being provided with a pair of right-and-left indicating radio direction finders each oriented to deliver an output current whose effective sense is determined by the direction with respect to the axis of said vessel from which a radio signal is received thereby, which includes the steps of tuning said direction finders respectively to receive signals from each of said transmitters, adjusting the sensitivity of said direction finders substantially to a predetermined ratio with respect to the strength of signals as received from the respective transmitters, mixing the output current of said direction finders, setting said vessel originally substantially along said course, and steering said vessel in accordance with the sense of said mixed output currents in a direction such as to reduce the total absolute value thereof.

6. The method of maintaining a vessel which is subject to deflection by cross-currents substantially upon a predetermined course, determined by a pair of substantially non-directional radio transmitters, operating at positions spaced along the line of said course to transmit waves of predetermined frequencies, said vessel being provided with a plurality of similarly oriented directional antenna systems mounted on said vessel with their receptional axes of symmetry parallel with the longitudinal axis of said vessel, a radio receiver coupled with each of said antenna systems, which comprises the steps of receiving upon the vessel a radio wave from each of said transmitters, causing each of said waves to develop an electric current which is indicative of the azimuth of reception, amplifying said currents substantially in inverse proportion to the intensity of said waves at their point of reception, combining the currents developed by the two waves to derive a resultant current, and employing the resultant current to control the course of the vessel.

RALPH W. GOBLE.
OLIVER V. PHILLIPS.